(12) United States Patent
Nagatsuka et al.

(10) Patent No.: US 8,589,122 B2
(45) Date of Patent: Nov. 19, 2013

(54) SIMULATION APPARATUS

(75) Inventors: Yoshiharu Nagatsuka, Yamanashi (JP); Kozo Inoue, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 460 days.

(21) Appl. No.: 12/625,083

(22) Filed: Nov. 24, 2009

(65) Prior Publication Data

US 2010/0153073 A1    Jun. 17, 2010

(30) Foreign Application Priority Data

Dec. 12, 2008    (JP) ................................ 2008-317446

(51) Int. Cl.
*G06F 17/50*    (2006.01)

(52) U.S. Cl.
USPC ............................ 703/1; 703/2; 703/6; 703/7

(58) Field of Classification Search
USPC ................................................. 703/1, 2, 6, 7
See application file for complete search history.

(56) References Cited

U.S. PATENT DOCUMENTS

| | | | |
|---|---|---|---|
| 6,853,881 B2* | 2/2005 | Watanabe et al. | 700/264 |
| 7,027,963 B2* | 4/2006 | Watanabe et al. | 703/1 |
| 7,194,396 B2* | 3/2007 | Watanabe et al. | 703/7 |
| 7,333,879 B2* | 2/2008 | Takizawa et al. | 700/259 |
| 7,734,358 B2* | 6/2010 | Watanabe et al. | 700/61 |
| 7,881,917 B2* | 2/2011 | Nagatsuka et al. | 703/7 |
| 2003/0090483 A1* | 5/2003 | Watanabe et al. | 345/419 |
| 2003/0090489 A1* | 5/2003 | Watanabe et al. | 345/473 |
| 2003/0090491 A1* | 5/2003 | Watanabe et al. | 345/473 |
| 2006/0030970 A1* | 2/2006 | Watanabe et al. | 700/248 |
| 2007/0142973 A1* | 6/2007 | Takizawa et al. | 700/259 |
| 2007/0213874 A1* | 9/2007 | Oumi et al. | 700/245 |
| 2007/0282485 A1* | 12/2007 | Nagatsuka et al. | 700/245 |
| 2008/0013825 A1* | 1/2008 | Nagatsuka et al. | 382/153 |
| 2009/0069939 A1* | 3/2009 | Nagatsuka et al. | 700/258 |
| 2010/0153073 A1* | 6/2010 | Nagatsuka et al. | 703/1 |

FOREIGN PATENT DOCUMENTS

| | | |
|---|---|---|
| EP | 1310844 A1 | 5/2003 |
| JP | 63267183 A | 11/1988 |
| JP | 10-143221 | 5/1998 |
| JP | 2003-150218 | 5/2003 |
| JP | 2004-148434 | 5/2004 |

OTHER PUBLICATIONS

Office Action for corresponding Japanese Application No. 2008-317446 issued Aug. 31, 2010.

* cited by examiner

*Primary Examiner* — Shambhavi Patel
(74) *Attorney, Agent, or Firm* — Lowe Hauptman & Ham LLP

(57) ABSTRACT

A simulation apparatus includes a simulation management unit for designating an elapsed time point, a robot operation calculation unit for causing the operation program to be executed to a designated elapsed time point to determine the operating position of the robot at the designated elapsed time point, a machine tool operation calculation unit for sequentially determining the operating position of the machine tool while at the same time executing the machining program continuously, and a machine tool operation storage unit for storing the determined operating position of the machine tool in correspondence with the elapsed time point each time a unit time elapses. The simulation management unit displays three-dimensional models of the robot and the machine tool on a display unit based on the operating positions of the robot and the machine tool at the designated elapsed time point acquired from the robot operation calculation unit and the machine tool operation calculation unit.

6 Claims, 4 Drawing Sheets

SIMULATION APPARATUS

RELATED APPLICATION

The present application is based on, and claims priority from, Japanese Application Number 2008-317446, filed Dec. 12, 2008, the disclosure of which is hereby incorporated by reference herein in its entirety.

BACKGROUND OF THE INVENTION

1. Field of the Invention

This invention relates to a simulation apparatus for simulating the operation of a working machine, such as a robot and a machine tool operating in accordance with a command program.

2. Description of the Related Art

With the recent sophistication of a production system, a plurality of robots and machine tools have often been combined to make up the production system. For example, a production system in which the door of a machine tool cell formed by surrounding the machine tool with a wall is opened/closed based on a signal from a robot or a PLC (programmable logic controller), so that when the door is open, the workpiece in the machine tool cell is changed by the robot, and after changing the workpiece, the door is closed and the new workpiece begins to be machined by the machine tool.

The robot, machine tool and PLC used in this production system are operated in accordance with a command program, and a test is often requested to be conducted without using a real machine before the actual construction of the production system to check whether the robot and the machine tool operate properly. To meet this requirement, simulation apparatuses of many types have been developed to simulate the operation of units of the machine tool and the robot off line. In addition, as described in Japanese Unexamined Patent Publication No. 63-267183, a simulation apparatus is available in which the operation of a plurality of robots can be simulated on the single simulation apparatus.

In the machine tool or the robot, a plurality of control mechanisms are used in combination, and complicated signal exchange and communication are carried out. However, it is difficult to express this signal exchange and the communication state as a numerical model. Therefore, in the simulation of the operation of the machine tool and the robot, an accurate result cannot be obtained by a method in which like in the simple numerical simulation of the operation, the time is advanced by a predetermined time each time using a numerical model in the same manner as if the time in the virtual space is stopped to determine the state of the machine tool or the robot at each moment. Especially, in the simulation software for the machine tool operation, a machining program is often executed continuously without stopping the lapse of time on simulation while at the same time determining the position (including the posture) of the machine tool at each moment.

On the contrary, the history of robot simulation is so old that even the signal exchange and the communication state can now be expressed as a numerical model, and an increased number of simulation software have come to be used in which the time is advanced by a predetermined time each time on simulation, and the state of the robot can be determined at each moment in the same manner as if the time stops at each moment.

As described above, the robot and the machine tool are often used in combination in the production system. Therefore, the operation of this production system as a whole is desirably simulated and displayed on a display unit. Especially, in realizing the operation in which the door of the machine tool cell is opened, the robot delivers the workpiece into the machine tool cell and installs it, followed by closing the door of the machine tool cell and starting the machining operation of the machine tool, the machine tool and the robot are required to communicate with each other with regard to completion of a predetermined operation using the interlocked commands. In such a case, it is necessary that the elapsed time on the robot simulation and the elapsed time on the machine tool simulation be synchronized with each other to simulate the operation of the production system as a whole, and also be displayed on the display unit at the same time.

However, a simulation apparatus capable of simulating the operation of different working machines such as the robot and the machine tool at the same time has never existed. In addition, even if the simulation software for simulating the operation of the robot and that for simulating the operation of the machine tool are used at the same time, the elapsed time of the two simulation usually fail to coincide with each other, and therefore the result of simulation of the operation of the entire production system configured of different working machines such as a robot and a machine tool could not be displayed on the display unit at the same time. Especially, in the case where the operation of a certain working machine (such as a robot) is simulated using the simulation software which can stop the lapse of time on simulation while at the same time simulating the operation of another working machine (such as a machine tool) using the simulation software incapable of stopping the lapse of time on simulation, the time elapsed on simulation software cannot be rendered to coincide with each other, and it is difficult to simulate the operation of the production system as a whole and display the result on the display unit at the same time.

SUMMARY OF THE INVENTION

Accordingly, it is an object of this invention to provide a simulation apparatus in which the operation of different working machines are simulated, and the result of simulation of the operation of different working machines can be displayed on a display unit at the same time.

In order to achieve this object, according to this invention, there is provided a simulation apparatus for simulating an operation of a first working machine and an operation of a second working machine using a first virtual working device and a second virtual working device simulating the operation of the first working machine and the second working machine, respectively, operated based on different command programs, and based on a result of the simulating, displays three-dimensional models of the first and second working machines on a display unit; the simulation apparatus comprising a simulation management unit for designating a designated elapsed time point, a first operation calculation unit for determining an operating position of the first working machine at the designated elapsed time point by causing the first virtual working machine to execute a command program of the first working machine until the designated elapsed time point, a second operation calculation unit for sequentially determining an operating position of the second working machine while continuously executing a command program of the second working machine on the second virtual working machine, and an operation storage unit for storing, in correspondence with each other, an elapsed time point and the operating position of the second working machine determined by the second operation calculation unit each time a predetermined unit time is passed; wherein the simulation management unit, after acquiring the operating position of the first working machine at the designated elapsed time point from the first operation calculation unit and the operating position of the second working machine at the designated elapsed time point from the operation storage unit, causes the display unit to display the three-dimensional models of the first and second working machines based on the acquired operating positions of the first and second working machines acquired, and designates a time point elapsed by a predetermined operation time from the designated elapsed time point as a next designated elapsed time point.

In the simulation apparatus described above, even in the case where the elapsed time point on the simulation of the second working machine executed by the second operation calculation unit fails to coincide with the elapsed time point on the simulation of the first working machine executed by the first operation calculation unit, the fact that the operating position of the second working machine determined by the second operation calculation unit is stored in the operating position storage unit in correspondence with the elapsed time point upon lapse of each predetermined unit time, makes it possible to display as if the elapsed time point of the first operation calculation unit and the elapsed time point of the second operation calculation unit on a display unit coincide with each other, by the simulation management unit acquiring, from the operation storage unit, the operating position of the second working machine corresponding to the elapsed time point coincident with the elapsed time point on the simulation executed by the first operation calculation unit. In addition, the simulation management unit, after acquiring the operating positions at the designated elapsed time point of both the first and second working machines, designates the time point elapsed a predetermined operation time from the designated elapsed time point as the next designated time point, and causes the first operation calculation unit to determine the operating position of the first working machine at the particular designated elapsed time point. Therefore, even in the case where the elapsed time on the simulation of the operation of the second working machine calculated by the second operation calculation unit is behind the designated elapsed time point, the simulation management unit waits until the operating position of the second working machine at the designated elapsed time point is determined by the second operation calculation unit, without designating the next designated elapsed time point to the first operation calculation unit. As a result, the situation in which the apparent elapsed time points cannot be rendered to coincide with each other can be avoided which otherwise might be caused by determining the operating position of the first working machine after lapse of the predetermined time from the designated time point before determining the operating position of the second working machine at the designated time point.

In this simulation apparatus, the first working machine and the second working machine may execute the respective command programs while communicating with each other. In such a case, the simulation management unit desirably assumes that the elapsed time point on the simulation by the second operation calculation unit stops during the time when the command program of the second working machine waits for the communication from the first working machine.

The first working machine can be assumed to be a robot, and the second working machine a machine tool.

According to this invention, the operation of different working machines are simulated in such a manner that even in the case where the operation of the one working machine is simulated by the first operating position calculation unit using the simulation software capable of stopping the time on the simulation and the operation of the other working machine is simulated by the second operating position calculation unit using the simulation software incapable of stopping the time on the simulation, the simulation result can be handled in the same manner as if the elapsed time point in the first operating position calculation unit coincides with the elapsed time point in the second operating position calculation unit, and therefore the simulation result of the operation of different working machines can be displayed at the same time on the display unit. As a result, the operation of the whole production system configured of different working machines can be simulated easily.

BRIEF DESCRIPTION OF THE DRAWINGS

The above and other objects, features and advantages of the invention will be explained in more detail based on the preferred embodiments of the invention with reference to the accompanying drawings, in which.

DETAILED DESCRIPTION OF THE INVENTION

Figure 1:
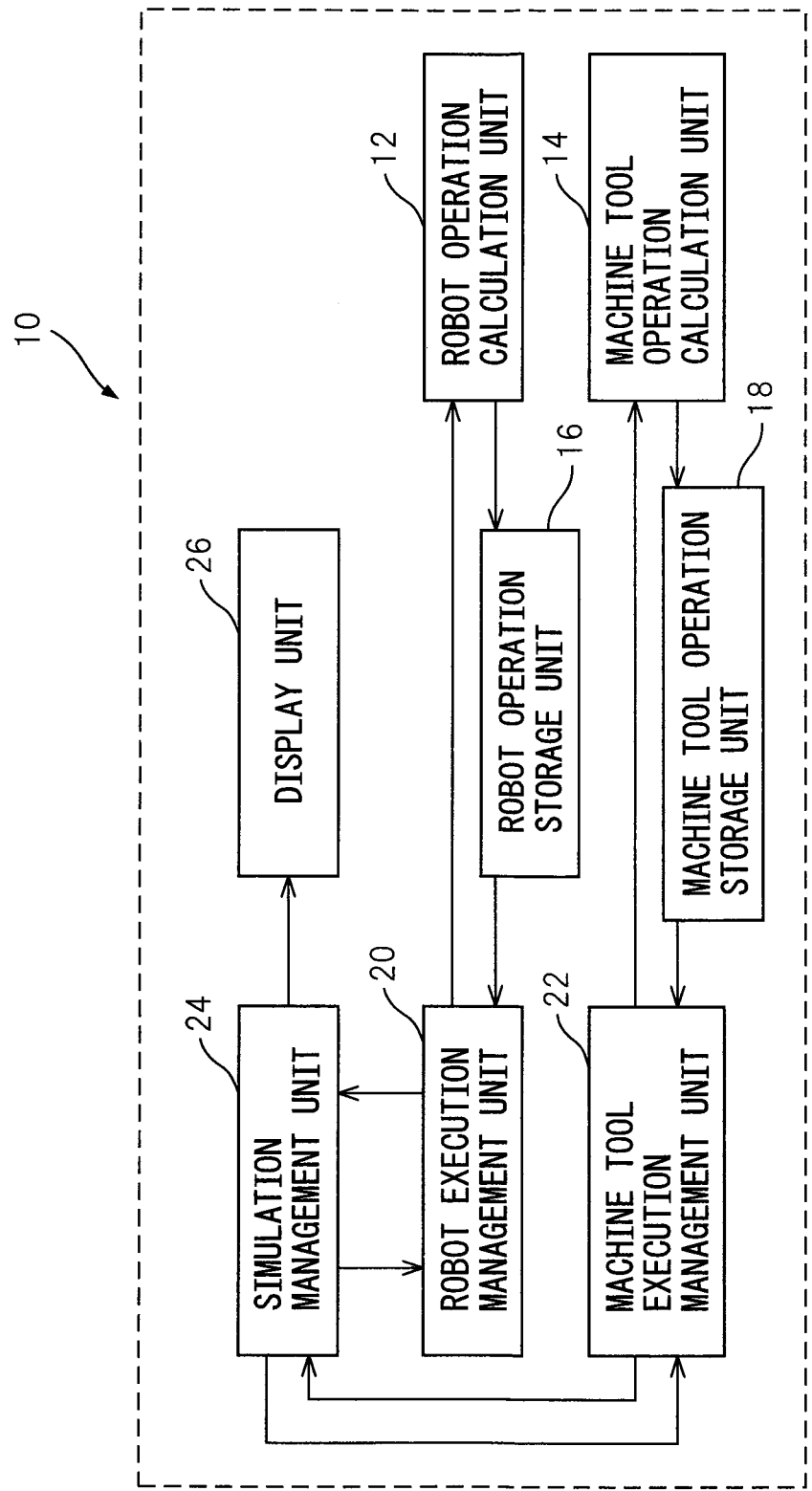
FIG. 1 is a function block diagram of a simulation apparatus according to the present invention.

A simulation apparatus according to an embodiment of the invention is explained below with reference to the drawings.

The simulation apparatus according to this invention simulates the operation of the production system as a whole configured of different working machines operated based on different command programs. According to the embodiment described below, the simulation apparatus simulates a production system in which a machine tool for machining a workpiece based on a machining program created by the operator and a robot operated based on an operation program created by the operator for supplying and retrieving a workpiece to and from the machine tool are used as working machines. However, the working machines of the production system capable of simulation by the simulation apparatus according to this invention, are not limited to the robot and the machine tool.

First, the general configuration of the simulation apparatus 10 is explained with reference to FIG. 1. The simulation apparatus 10 includes a robot operation calculation unit 12, a machine tool operation calculation unit 14, a robot operation storage unit 16, a machine tool operation storage unit 18, a robot execution management unit 20, a machine tool execution management unit 22, a simulation management unit 24 and a display unit 26. In the simulation apparatus 10, the robot and the machine tool are simulated using a virtual robot simulating the robot and a virtual machine tool simulating the machine tool, and based on the simulation result, the three-dimensional models of the robot and the machine tool are displayed at the same time on the display unit. The display unit 26 includes an image processing unit (not shown) for processing the information on the operating positions of the robot and the machine tool and changing the positions of the robot and the machine tool on the screen.

The robot operation calculation unit 12 simulates a robot in a virtual space according to the robot simulation software thereby to realize a virtual robot. In the robot operation calculation unit 12, the operation and the signal condition of the robot with a real robot executing the operating program executed by executing the operation program on the virtual robot are virtually reproduced thereby to arithmetically determine the operating position and the signal condition of the robot at a designated elapsed time point t. Many types of robot simulation software are available in which the lapse of time on simulation can be controlled. The robot simulation software used in this embodiment is so configured that upon designation of the designated elapsed time point t, the operating position and the signal condition of the virtual robot operated until the designated elapsed time point t in accordance with the operation program are output with the elapsed time point, and the lapse of time in robot simulation can be stopped until the next designated elapsed time point t is designated. In addition, the information on the operating position of the robot is assumed to contain the robot posture.

The machine tool operation calculation unit 14 realizes a virtual machine tool by simulating a machine tool in the virtual space by the machine tool simulation software. In the machine tool operation calculation unit 14, the operation and the signal condition of the machine tool with a real machine tool executing the machining program executed by executing the machining program for the real machine tool on the virtual machine tool is virtually reproduced, and the operating positions of the table and the tool and the signal condition of the machine tool are determined by arithmetic operation. Incidentally, there are only few machine tool simulation software available in which the lapse of time on simulation can be controlled. According to the machine tool simulation software used in this embodiment, the lapse of time on the machine tool simulation cannot be stopped, and upon reception of an execution command, the machining program of the machine tool is executed continuously, and the operating position and the signal condition of the virtual robot operated in accordance with the machining program are output with the elapsed time point for each designated unit time tu. In addition, the information on the operating positions of the table and the tool contains the posture of the table and the tool.

The robot operation storage unit 16 and the machine tool operation storage unit 18 are realized by a RAM, a volatile memory or a hard disk drive, etc. The robot operation storage unit 16, arranged between the robot operation calculation unit 12 and the robot execution management unit 20, functions as a provisional storage unit. In the robot operation storage unit 16, the operating position and the signal condition of the robot at the designated elapsed time point t determined by the robot operation calculation unit 12 are stored provisionally, and delivered to the robot execution management unit 20. However, the robot operation storage unit 16, is not necessarily provided, and as described later, the information on the operating position and the signal condition of the robot determined by the robot operation calculation unit 12 may be delivered directly to the robot execution management unit 20. On the contrary, the machine tool operation storage unit 18, arranged between the machine tool operation calculation unit 14 and the machine tool execution management unit 22, functions as a buffer unit, and operates in such a manner that the operating positions of the table and the tool and the signal condition of the machine tool determined by the machine tool operation calculation unit 14 are stored for every unit time to in correspondence with the elapsed time, and in accordance with the designation of the designated elapsed time point t by the machine tool execution management unit 22, the information on the operating position of the table and the tool and the signal condition of the machine tool at the designated elapsed time point t are delivered to the machine tool execution management unit 22.

The elapsed time point of the robot simulation by the robot operation calculation unit 12 is normally different from the elapsed time point of the machine tool simulation by the machine tool operation calculation unit 14, and therefore it is normally difficult for both the robot execution management unit 20 and the machine tool execution management unit 22 to acquire the information on the operating position and the signal condition at the same timing. However, in the simulation apparatus 10, the provision of the machine tool operation storage unit 18 permits the machine tool execution management unit 22 to acquire the information on the operating position of the table and the tool and the signal condition of the machine tool at the designated elapsed time point t from the machine tool operation storage unit 18 at substantially the same timing as the robot execution management unit 20 acquires the information on the operating position and the signal condition of the robot at the designated elapsed time point t.

The robot execution management unit 20 functions to manage the lapse of time in the robot simulation by the robot operation calculation unit 12. Specifically, the robot execution management unit 20, upon reception of the designation from the simulation management unit 24, of the elapsed time point of the simulation result next to be displayed on the display unit 26 as the designated elapsed time point t, issues a command to the robot operation calculation unit 12 to pass the time on simulation from the present elapsed time point to the designated elapsed time point t. Thus, the robot execution management unit 20 acquires, from the robot operation calculation unit 12 or the robot operation storage unit 16, the information on the operating position and the signal condition of the robot at the designated elapsed time point t determined by the robot operation calculation unit 12, and delivers the information thus acquired to the simulation management unit 24.

The machine tool execution management unit 22 functions to manage the time lapse of the machine tool simulation by the machine tool operation calculation unit 14. Specifically, the machine tool execution management unit 22, upon reception of the designation, from the simulation management unit 24, of the elapsed time of the simulation result next to be displayed on the display unit 26 as the designated elapsed time point t, acquires the operating position and the signal condition of the machine tool at the designated elapsed time point t, and delivers it to the simulation management unit 24.

However, in the machine tool simulation performed by the machine tool operation calculation unit 14, the time lapse can be neither stopped nor controlled. Therefore, the machine tool execution management unit 22 actually acquires the information on the operating position and the signal condition of the machine tool at the elapsed time point corresponding to the designated elapsed time point t, from the result of the machine tool simulation stored in the machine tool operation storage unit 18 (i.e., the operating position of the table and the tool and the signal condition of the machine tool stored in the form related to the elapsed time point for each designated unit time tu).

In the simulation management unit 24, upon completion of display of the simulation result on the display unit 26, the time elapsed by the predetermined operation time td from the elapsed time point of the simulation result displayed on the display unit 26 is designated as the designated elapsed time point t to the robot execution management unit 20 and the machine tool execution management unit 22 thereby to acquire the information on the operating position and the signal condition at the designated elapsed time point t of both the robot and the machine tool. Based on the information thus acquired, the positions of the robot and the machine tool displayed on the display unit 26 at that particular time point are changed, and the robot and the machine tool are displayed at the operating positions at the designated elapsed time point t, and the time point elapsed by the predetermined operation time td from the designated elapsed time point t is designated as the next designated elapsed time point t to the robot execution management unit 20 and the machine tool execution management unit 22. In addition, in the simulation management unit 24, the signal condition of the robot at the designated elapsed time point t acquired from the robot execution management unit 20 is delivered to the machine tool operation calculation unit 14 through the machine tool execution management unit 22, and at the same time, the signal condition of the machine tool at the designated elapsed time point t acquired from the machine tool execution management unit 22 is delivered to the robot operation calculation unit 12 through the robot execution management unit 20.

As described above, the simulation management unit 24, after acquiring the operating position and the signal condition of both the robot and the machine tool at the designated elapsed time point t, designates the next designated elapsed time t to the robot execution management unit 20 and the machine tool execution management unit 22. Therefore, in the case where the elapsed time point in the machine tool simulation performed by the machine tool operation calculation unit 14 is behind the designated elapsed time point t, the simulation management unit 24 waits until the operating position and the signal condition of the machine tool at the designated elapsed time point t is determined by the machine tool operation calculation unit 14, and after acquiring the operating position and the signal condition of both the robot and the machine tool at the designated elapsed time point t, causes the machine tool operation calculation unit 14 to determine the operating position and the signal condition of the machine tool at the next designated elapsed time point (t+d) after the predetermined operation time td from the designated elapsed time point t.

In the case where the robot operation program accesses the operating position and the signal condition of the machine tool or the machining program of the machine tool accesses the operating position and the signal condition of the robot, the operation program and the machining program contains an interlock command to stop the progress of the program until the operating position and the signal condition to be accessed are obtained. In the robot simulation executed by the robot operation calculation unit 12, upon lapse of time to the designated elapsed time point t, the time lapse is stopped to wait for the designation of the next designated elapsed time t. Therefore, the simulation management unit 24, after acquiring the operating position and the signal condition of both the robot and the machine tool at the designated elapsed time point t, receives the designation of the next designated elapsed time (t+td) through the robot execution management unit 20. Therefore, the elapsed time point in the robot simulation never advances ahead of the designated elapsed time point t. As a result, the operating position and the signal condition of the machine tool at the designated elapsed time point t is always established before the operating position and the signal condition of the robot at the next designated elapsed time point (t+td) is determined. Therefore, even in the case where the operation program of the robot contains the interlock command, the operating position and the signal condition of the machine tool at the designated elapsed time point t is reflected in the operating position and the signal condition of the robot at the next designated elapsed time point (t+td).

In the machine tool simulation executed by the machine tool operation calculation unit 14, the time lapse cannot be stopped, and the elapsed time in the machine tool simulation may advance ahead of the designated elapsed time point t. In such a case, the machining program continues to wait until the designated elapsed time point t advances to the elapsed time point in the machine tool simulation with the operating position and the signal condition of the robot accessed by the machining program of the machine tool based on the interlock command and the operating position and the signal condition of the robot at the particular elapsed time point are obtained. However, the time in the machine tool simulation elapses, during the signal standby mode. Therefore, in the case where the machining program enters the standby state based on the interlock command in the machine tool simulation, the simulation management unit 24 assumes that the time is not elapsed. In the case where the elapsed time point stored in the machine tool operation storage unit 18 less the time during which the signal standby mode continues becomes equal to the designated elapsed time point t, for example, the simulation management unit 24 uses the operating position and the signal condition corresponding to the particular elapsed time point as the operating position and the signal condition, respectively, of the machine tool at the designated elapsed time point t. By doing so, the operating position and the signal condition of the robot at the designated elapsed time point t is reflected in the operating position and the signal condition, respectively, of the machine tool at the next designated elapsed time point (t+td).

Figure 2:
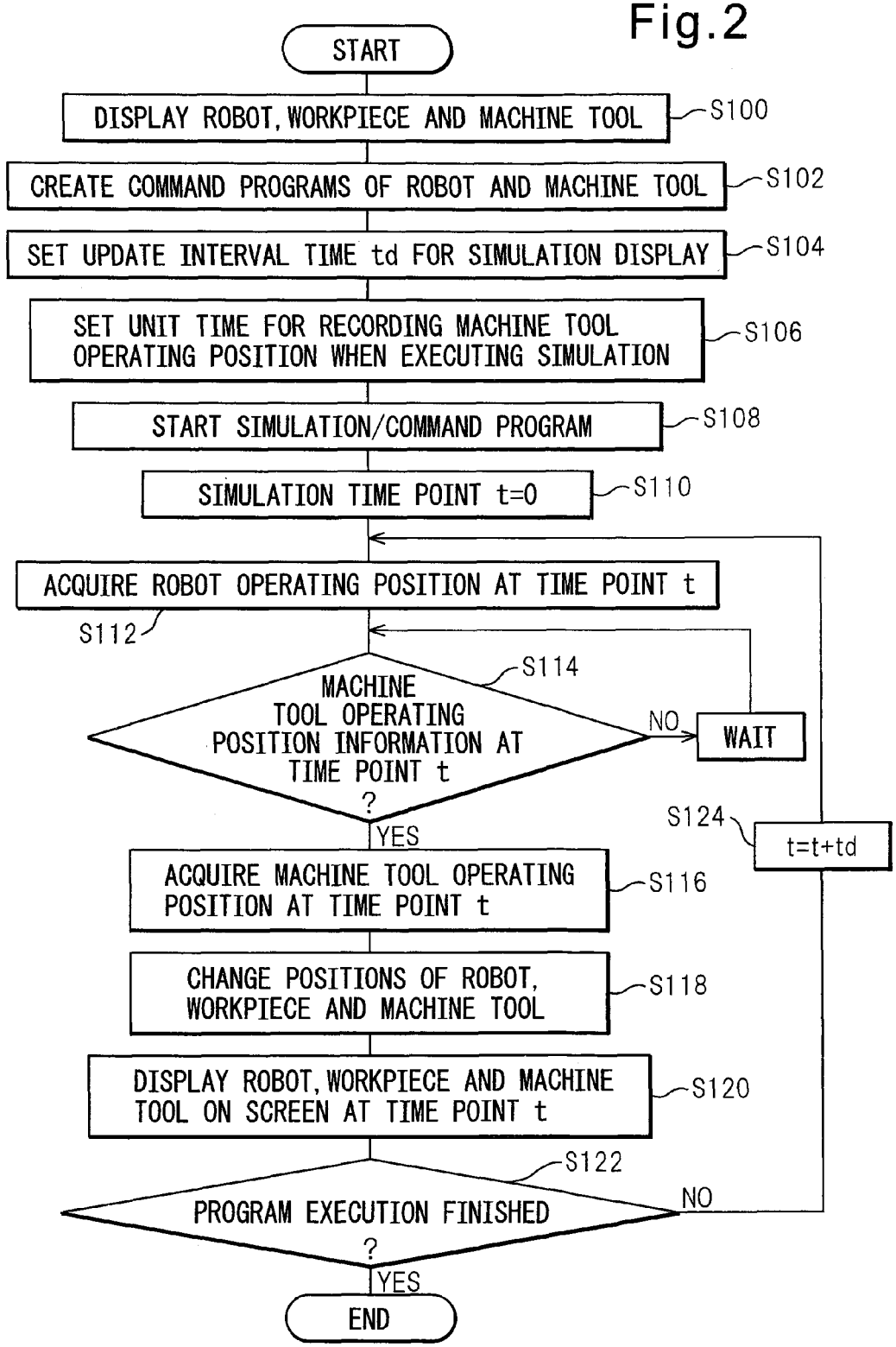
FIG. 2 is a flowchart showing the flow of the simulation by the simulation apparatus of FIG. 1 in the case where the interlock command is not contained in the operation program of a robot and the machining program of a machine tool.

Then, with reference to the flowchart of FIG. 2, an explanation is given about the flow of simulation by the simulation apparatus 10 in FIG. 1 in the case where the interlock command is contained in neither the operation program of the robot nor the machining program of the machine tool.

First, in preparation for the simulation, the shape and the initial position (including the posture) of the three-dimensional models of the robot, the workpiece and the machine tool are defined and displayed them on the display unit 26 (step S100). Further, the operation program to be executed by the real robot and the machining program to be executed by the real machine tool are created and read into the simulation apparatus 10 (step S102). In addition, an update interval time td for updating the image displayed on the display unit 26 of the simulation apparatus 10 is set (step S104), while at the same time setting a unit time to for storing the operating position of the machine tool when executing the machine tool simulation in the machine tool operation storage unit 18 (step S106).

Upon completion of the above preparation, the simulation by the simulation apparatus 10 is started (step S108). Once the simulation is started, the elapsed time point t is set to zero as the simulation starting time, and the robot simulation software for realizing a virtual robot simulating the operation of the real robot is activated by the robot operation calculation unit 12 thereby to execute the operation program of the real robot on the virtual robot. In addition, in the machine tool operation calculation unit 14, the machine tool simulation software for realizing a virtual machine tool simulating the operation of the real machine tool is activated and the machining program such as the NC program of the real machine tool is executed on the virtual machine tool (step S110).

Then, the robot operation calculation unit 12 determines the operating position of the virtual robot operated up to the designated elapsed time point t in accordance with the operation program, and after outputting the determined operating position as the operating position of the robot at the designated elapsed time t, waits for the designation of the next designated elapsed time point t with the time lapse of the robot simulation stopped. On the contrary, in the machine tool simulation performed by the machine tool operation calculation unit 14, the machine tool simulation software is executed continuously and the time lapse of the machine tool simulation cannot be stopped. Therefore, the machine tool operation calculation unit 14 continuously determines the operating positions of the table and the tool of the machine tool with the machining operation performed by the virtual machine tool in accordance with the machining program, and the operating position thus determined are stored in the machine tool operation storage unit 18 in correspondence with the elapsed time for each unit time to preset in step S106.

As the first step of simulation of the production system as a whole, the display update interval time td set in step S104 is regarded as the operation time by the simulation management unit 24, and the time point elapsed by the update interval time td from the elapsed time point of the simulation result already displayed on the display unit 26 is designated to the robot execution management unit 20 and the machine tool execution management unit 22 as the designated elapsed time t. The robot execution management unit 20, upon designation of the designated elapsed time t, causes the robot operation calculation unit 12 to determine the operating position of the virtual robot operated up to the designated elapsed time t in accordance with the operation program thereby to acquire the determined operating position as the robot operating position at the designated elapsed time t (step S112). The information on the robot operating position determined by the robot operation calculation unit 12 may be delivered to the robot execution management unit 20 directly or after being provisionally stored in the robot operation storage unit 16. On the contrary, the machine tool execution management unit 22, upon designation of the designated elapsed time t, checks whether the operating position of the machine tool at the elapsed time point t is stored in the machine tool operation storage unit 18 or not (step S114), and if so stored, acquires the operating position of the machine tool at the elapsed time point t from the machine tool operation storage unit 18 (step S116). In the case where the operating position of the machine tool at the designated elapsed time point t is not stored in the machine tool operation storage unit 18, the machine tool execution management unit 22 waits until the operating position of the machine tool at the elapsed time point t is determined by the machine tool operation calculation unit 14 and stored in the machine tool operation storage unit 18.

The robot execution management unit 20 and the machine tool execution management unit 22, upon acquisition of the information on the operating positions of the robot and the machine tool at the designated elapsed time point t, respectively, deliver the acquired information to the simulation management unit 24. The simulation management unit 24, upon acquisition of the information on the operating position at the designated elapsed time point t from the robot execution management unit 20 and the machine tool execution management unit 22, changes the display position (including the posture) of the robot, the workpiece and the table and the tool of machine tool based on the acquired information (step S118), and in order to update the display of the simulation result, causes the display unit 26 to display the robot, the workpiece and the table and the tool of the machine tool at the positions after the change (step S120). Incidentally, the position of the workpiece, if held in the robot, can be determined from the position of the robot and, if arranged on the machine tool table, from the position of the machine tool table.

Once the display of the simulation result on the display unit 26 is updated, the simulation management unit 24 checks whether the operation program of the robot and the machining program of the machine tool are finished or not (step S122), and in the case where the operation program and the machining program are finished, ends the execution of the simulation. In the case where the operation program and the machining program are yet to be finished, the simulation management unit 24 repeats the process of steps S112 to S122 with the sum of the designated elapsed time t and the update interval time td as a new designated elapsed time t until the operation program and the machining program are finished (step S124).

Figure 3:
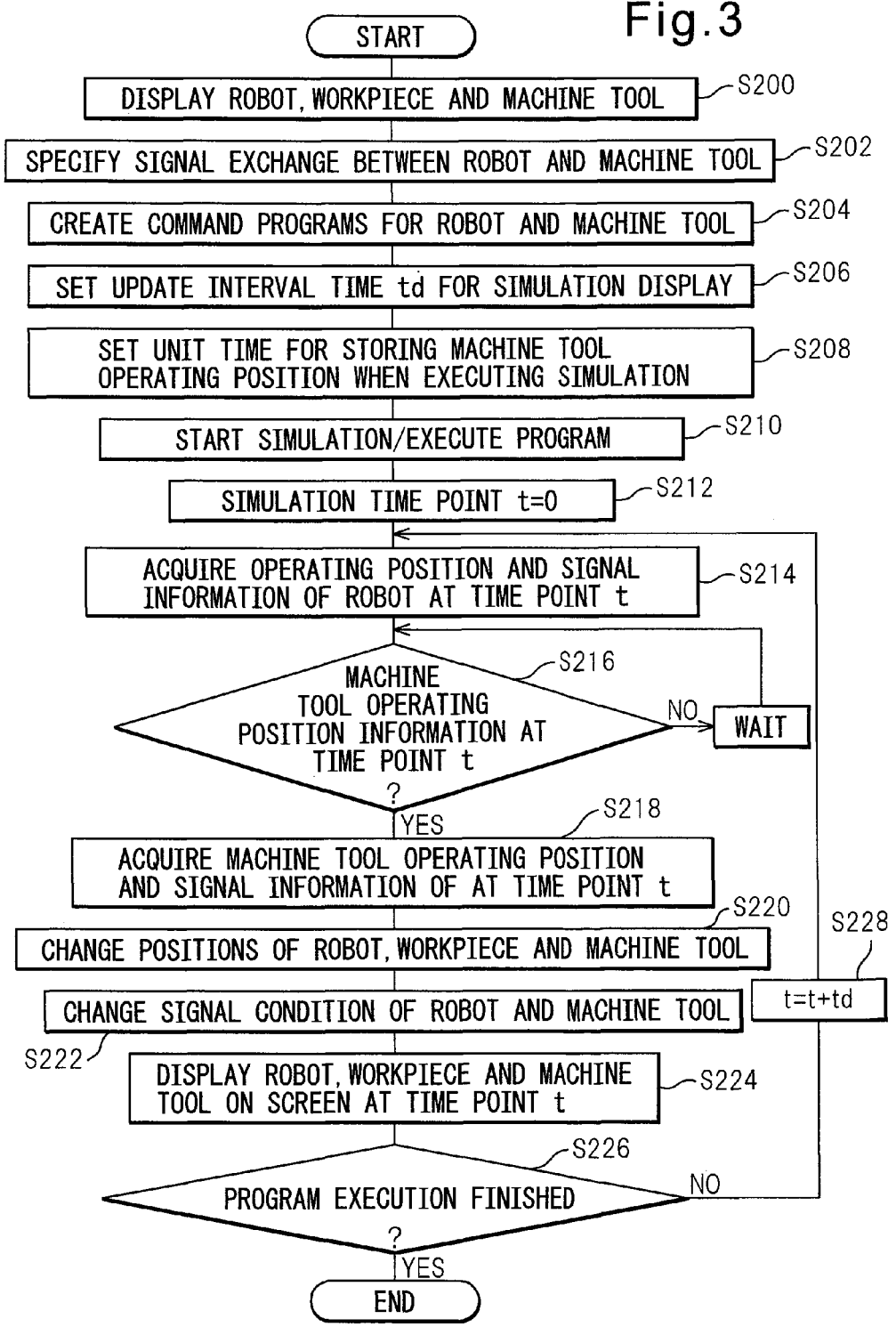
FIG. 3 is a flowchart showing the flow of the simulation by the simulation apparatus of FIG. 1 in the case where the interlock command is contained in the operation program of a robot and the machining program of a machine tool.

Then, with reference to the flowchart of FIG. 3, an explanation is given about the flow of the simulation conducted by the simulation apparatus 10 shown in FIG. 1 in the case where the interlock command is contained in the operation program of the robot and the machining program of the machine tool.

Figure 4:
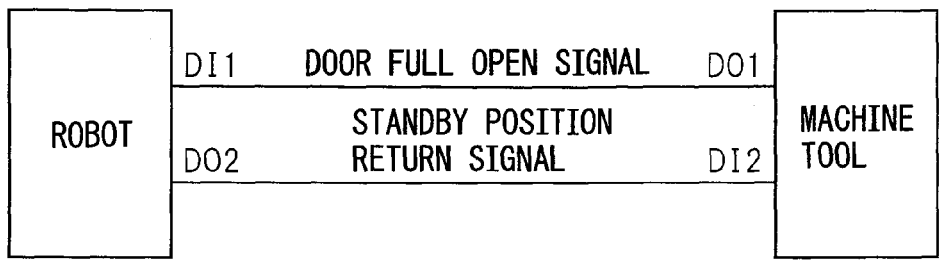
FIG. 4 is a diagram showing the connection of the signal lines between the robot and the machine tool.

First, in preparation for simulation, the shapes and the initial positions (including the posture) of the three-dimensional models of the robot, the workpiece and the machine tool are defined and displayed on the display unit 26 as in the case of FIG. 2 (step S200). Then, unlike in the case shown in FIG. 2, the types of signals to be exchanged between the robot and the machine tool are specified (S202). In the case under consideration, as shown in FIG. 4, an explanation is given on the assumption that the signal line for supplying a door full open signal to the digital input terminal DI1 of the robot from the digital output terminal D01 of the machine tool with the machine tool cell door full open and the signal line for supplying a standby position return signal from the digital output terminal D02 of the robot to the digital input terminal DI2 of the machine tool with the robot returned to the standby position, are connected between the robot and the machine tool.

Then, the operation program executed by the real robot and the machining program executed by the real machine tool are created, and read into the simulation apparatus 10 (step S204), and the update interval time td for updating the image displayed on the display unit 26 of the simulation apparatus 10 is set (step S206). Further, the unit time to for storing the operating position of the machine tool when executing the machine tool simulation in the machine tool operation storage unit 18 is set (step S208).

Figure 5:
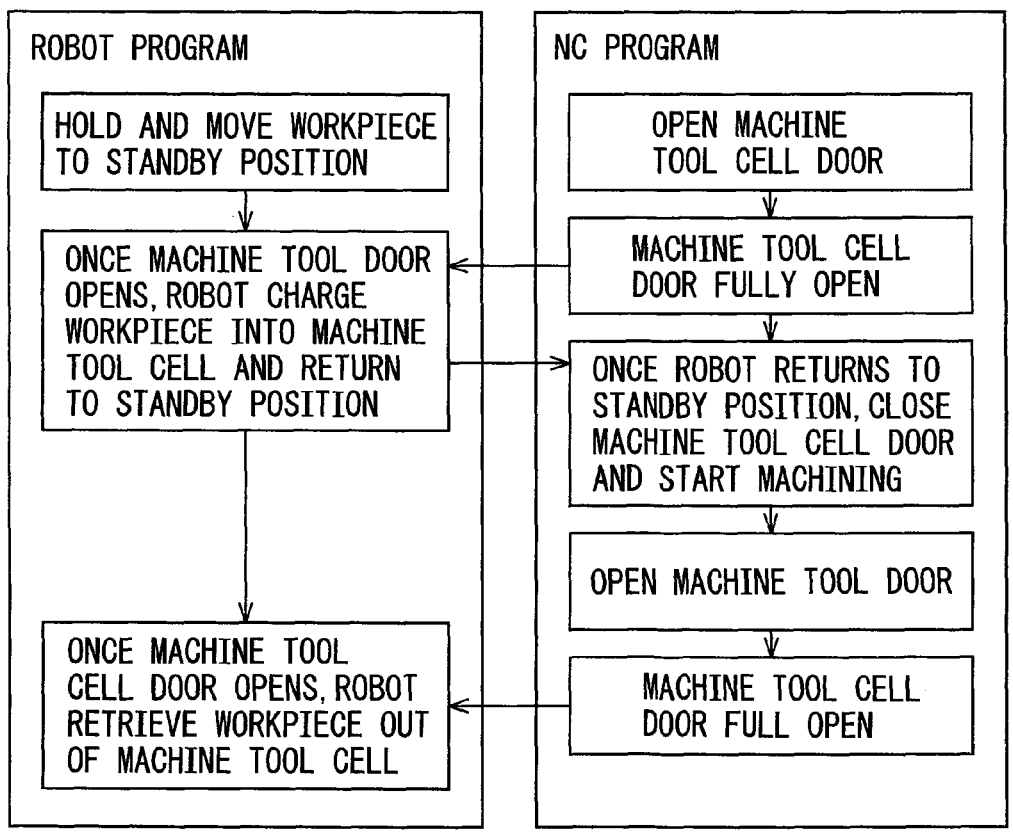
FIG. 5 is a diagram explaining an example of signal exchange between the operation program of the robot and the machining program of the machine tool containing the interlock command.

The operation program of the robot and the machining program of the machine tool created in step S204 are assumed to contain an interlock command for stopping the progress of the operation program until reception of the signal from the machine tool and an interlock command for stopping the progress of the machining program until reception of the signal from the robot, respectively. As shown in FIG. 5, for example, the operation program of the robot is created to operate the robot in three stages: (1) The robot holding a workpiece not yet to be machined moves to a standby position and waits until the machine tool cell door opens; (2) Upon reception, through the digital input terminal DI1 of the robot, the door full open signal output from the digital output terminal DO1 of the machine tool with the machine tool cell door full open, the robot arranges the workpiece on the table of the machine tool cell through the open door, and returning to the standby position, outputs a standby position return signal from the digital output terminal DO2 of the robot, while at the same time waiting until the workpiece is completely machined by the machine tool and the machine tool cell door opens; and (3) The robot retrieves the machined workpiece from the table of the machine tool cell upon reception, through the digital input terminal DI1 of the robot, the door full signal output from the digital output terminal DO1 of the machine tool when the workpiece is completely machined by the machine tool and the machine tool cell door opens again. In similar manner, the machining program of the machine tool is created to operate the machine tool in three stages: (1) When the door of the machine tool cell begins to open and fully opens, the door full open signal is output from the digital output terminal DO1 of the machine tool; (2) The workpiece not yet to be machined is arranged on the table of the machine tool cell through the door by the robot, and upon reception, through the digital input terminal DI2 of the machine tool, of the standby position return signal output from the digital output terminal DO2 of the robot having returned to the standby position, the machine tool closes the door of the machine tool cell and starts the machining operation; and (3) Upon complete machining of the workpiece, the door of the machine tool cell is opened, and upon full opening of the door, the door full open signal is output from the digital output terminal DO1 of the machine tool, and the machine tool waits until the machined workpiece is retrieved from the table of the machine tool cell by the robot.

Upon completion of this preparation, the simulation is started by the simulation apparatus 10 (step S210). Once the simulation is started, the elapsed time t is set to zero as the simulation starting time, and in the same manner as in the case shown in FIG. 2, the operation program of the real robot is executed on the virtual robot by the robot operation calculation unit 12, while the machining program of the real machine tool is carried out on the virtual machine tool by the machine tool calculation unit 14 (step S212).

Then, the robot operation calculation unit 12 determines the operating position and the signal condition of the virtual robot operated up to the elapsed time point t in accordance with the operation program, and after outputting the operating position and the signal condition thus determined as the operating position and the signal condition of the robot, respectively, at the elapsed time t, waits for the designation of the next elapsed time point with the time lapse of the robot simulation stopped. On the contrary, in the machine tool simulation conducted by the machine tool operation calculation unit 14, the machine tool simulation software is continuously executed, and the time lapse of the machine tool simulation cannot be stopped. Therefore, the machine tool operation calculation unit 14, continuously determines the operating position and the signal condition of the table and the tool of the machine tool with the machining operation performed on the virtual machine tool in accordance with the machining program, and for each unit time to preset in step S208, the operating position and the signal condition determined are stored in the machine tool operation storage unit 18 in correspondence with the elapsed time. Incidentally, the embodiment shown in FIG. 3 is different from the embodiment shown in FIG. 2 in that the robot operation calculation unit 20 and the machine tool operation calculation unit 22 determine the signal condition in addition to the operating position of the robot and the machine tool, respectively.

In the first step of simulation of the production system as a whole, the simulation management unit 24, assuming that the update interval time td for display set in step S206 as the operation time, designates to the robot execution management unit 20 and the machine tool execution management unit 22, as the designated elapsed time t, the time point passed by the update interval time td from the elapsed time point of the simulation result displayed on the display unit 26. The robot execution management unit 20, upon designation of the designated elapsed time point t, causes the robot operation calculation unit 12 to determine the operating position and the signal condition of the virtual robot operated up to the designated elapsed time point t in accordance with the operation program, and acquires the operating position and the signal condition thus determined as the operating position and the signal condition, respectively, of the robot at the designated elapsed time point t (step S214). The information on the operating position and the signal condition determined by the robot operation calculation unit 12 may be delivered to the robot execution management unit 20 directly or after being provisionally stored in the robot operation storage unit 16. On the contrary, the machine tool execution management unit 22, upon designation of the designated elapsed time t, checks whether the operating position and the signal condition of the machine tool at the designated elapsed time t are stored in the machine tool operation storage unit 18 or not (step S216), and in the case where they are so stored, acquires the operating position and the signal condition of the machine tool at the designated elapsed time t from the machine tool operation storage unit 18 (step S218). In the case where the operating position and the signal condition of the machine tool at the designated elapsed time t are not stored in the machine tool operation storage unit 18, the machine tool execution management unit 22 waits until the operating position and the signal condition of the machine tool at the designated elapsed time t are determined by the machine tool operation calculation unit 14 and stored in the machine tool operation storage unit 18.

The robot execution management unit 20 and the machine tool execution management unit 22, upon acquisition of the information on the operating position and the signal condition of the robot and the machine tool, respectively, at the designated elapsed time t, deliver the acquired information to the simulation management unit 24. The simulation management unit 24, upon acquisition of the information on the operating position and the signal condition at the designated elapsed time t from the robot execution management unit 20 and the machine tool execution management unit 22, changes the display position (including the posture) of the robot, the workpiece and the table and the tool of the machine tool based on the acquired information on the operating position (step S220), while at the same time changing the signal condition of the robot and the machine tool based on the acquired information on the signal condition (step S222). Then, in order to update the display of the simulation result, the simulation management unit 24 causes the display unit 26 to display the robot, the workpiece and the table and the tool of the machine tool at the positions after the change (step S224). Incidentally, the position of the workpiece, if held by the robot, can be determined from the position of the robot, and if arranged on the table of the machine tool, from the position of the table of the machine tool. Once the display of the simulation result on the display unit 26 is updated, the simulation management unit 24 checks whether the operation program of the robot and the machining program of the machine tool are finished or not (step S226), and in the case where the operation program and the machining program are finished, completes the execution of the simulation. On the contrary, in the case where the operation program and the machining program are not yet finished, the simulation management unit 24 repeats the process of steps S214 to 5226 with the sum of the designated elapsed time t and the update interval time td as a new designated elapsed time t until the operation program and the machining program are finished (step S228).

As described above, with the simulation apparatus 10 shown in FIG. 1, the simulation of the operation of the robot and the machine tool different in type can be carried out at the same time using different types of the simulation software including the simulation software capable of controlling the elapsed time and the simulation software incapable of controlling the elapsed time, and as the result of simulation of the whole production system including the robot and the machine tool, the robot and the machine tool at each elapsed time point can be displayed simultaneously on the display unit 26 in accordance with the result of simulation of the robot and the machine tool. Thus, whole production system including both of the robot and the machine tool can be easily considered. In addition, the operating position of the robot according to the operation program used for the real robot and the operating position of the machine tool according to the machining program used for the real machine tool can be accurately confirmed without using the production line configured of a real robot and a real machine tool. Thus, the adjustment work at the job site can be carried out easily within a short time.

Although the simulation apparatus 10 according to the invention is explained above with reference to the embodiment shown, the present invention is not limited to this embodiment. Instead of the simulation of the production line configured of one robot and one machine tool as in the embodiment shown, for example, the simulation of the production line using two or more robots and two or more machine tools can be carried out with equal effect. In addition, according to the shown embodiment, the simulation software capable of stopping the time lapse (i.e., the simulation software capable of controlling the elapsed time) is used for the robot simulation, while the simulation software incapable of stopping the time lapse (i.e., the simulation software incapable of controlling the elapsed time) is used for the machine tool simulation. However, conversely, the simulation software incapable of stopping the time lapse may be used for the robot simulation, while the simulation software capable of stopping the time lapse may be used for the machine tool simulation.

The invention claimed is:

1. A simulation apparatus for simulating an operation of a first working machine and an operation of a second working machine using a first virtual working device and a second virtual working device simulating the operation of the first working machine and the second working machine, respectively, operated based on different first and second command programs, respectively, and displaying three-dimensional models of the first and second working machines on a display unit based on a result of the simulating, comprising:

a simulation management unit for designating a designated elapsed time point;

a first operation calculation unit for determining an operating position of the first working machine at the designated elapsed time point by causing the first virtual working machine to execute the first command program of the first working machine until the designated elapsed time point, the first command program including first simulation software capable of stopping time on a simulation of the operation of the first working machine to determine the operating position of the first working machine;

a second operation calculation unit for sequentially determining an operating position of the second working machine while continuously executing the second command program of the second working machine on the second virtual working machine, the second command program including second simulation software incapable of stopping time on a simulation of the operation of the second working machine to determine the operating position of the second working machine; and an operation storage unit for storing, in correspondence with each other, an elapsed time point and the operating position of the second working machine determined by the second operation calculation unit each time a predetermined unit time is passed;

wherein the simulation management unit is configured to, after acquiring the operating position of the first working machine at the designated elapsed time point from the first operation calculation unit and the operating position of the second working machine at the designated elapsed time point from the operation storage unit, cause the display unit to display the three-dimensional models of the first and second working machines based on the acquired operating positions of the first and second working machines, and designate, as a next designated elapsed time point, a time point elapsed by a predetermined operation time from the designated elapsed time.

2. The simulation apparatus according to claim 1, wherein the first working machine and the second working machine are configured to execute the respective command programs while communicating with each other.

3. The simulation apparatus according to claim 2, wherein the simulation management unit is configured to use an operating position, which corresponds to an elapsed time point where the elapsed time point stored in the operation storage unit less the time during which a signal standby mode continues becomes equal to a designated time point, as the operating position of the second working machine at the designated time point, and the simulation management unit is configured to assume that the time lapse of the simulation by the second operation calculation unit stops during the time when the second command program of the second working machine waits for the communication from the first working machine.

4. The simulation apparatus according to claim 1, wherein the first working machine is a robot and the second working machine is a machine tool.

5. The simulation apparatus according to claim 2, wherein the first working machine is a robot and the second working machine is a machine tool.

6. The simulation apparatus according to claim 3, wherein the first working machine is a robot and the second working machine is a machine tool.

* * * * *